United States Patent
Anglin et al.

(10) Patent No.: US 10,820,154 B2
(45) Date of Patent: Oct. 27, 2020

(54) LOCATION-BASED HOME SCREEN CUSTOMIZATION

(71) Applicant: INTERNATIONAL BUSINESS MACHINES CORPORATION, Armonk, NY (US)

(72) Inventors: Debbie A. Anglin, Leander, TX (US); Jeffrey A. Calcaterra, Chapel Hill, NC (US); Su Liu, Austin, TX (US); John D. Wilson, League City, TX (US); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 15/180,168

(22) Filed: Jun. 13, 2016

(65) Prior Publication Data
US 2017/0357408 A1    Dec. 14, 2017

(51) Int. Cl.
| | |
|---|---|
| H04W 4/029 | (2018.01) |
| H04W 4/021 | (2018.01) |
| H04W 4/18 | (2009.01) |
| H04W 4/50 | (2018.01) |
| G06F 1/16 | (2006.01) |

(52) U.S. Cl.
CPC .......... *H04W 4/029* (2018.02); *G06F 1/1684* (2013.01); *H04W 4/021* (2013.01); *H04W 4/18* (2013.01); *H04W 4/50* (2018.02); *G06F 2200/1637* (2013.01); *H04M 2250/10* (2013.01)

(58) Field of Classification Search
None
See application file for complete search history.

(56) References Cited

U.S. PATENT DOCUMENTS

| | | | |
|---|---|---|---|
| 8,412,150 B2 | 4/2013 | Louch | |
| 8,751,319 B2 | 6/2014 | Silverstein et al. | |
| 8,869,235 B2 | 10/2014 | Qureshi et al. | |
| 8,938,673 B2 | 1/2015 | Lee et al. | |
| 2005/0193340 A1 | 9/2005 | Amburgey et al. | |
| 2010/0318701 A1* | 12/2010 | Srinivasan | G06Q 10/10 710/104 |
| 2012/0034962 A1* | 2/2012 | Amaitis | G07F 17/3276 463/13 |
| 2012/0144346 A1* | 6/2012 | Meredith | H04W 4/029 715/863 |

(Continued)

OTHER PUBLICATIONS

Bing search q=crowdsource%20homepage&qs=n&form= (Year: 2020).*

(Continued)

*Primary Examiner* — Cesar B Paula
*Assistant Examiner* — John M Heffington
(74) *Attorney, Agent, or Firm* — Patterson + Sheridan, LLP

(57) ABSTRACT

Systems, methods, and computer program products to perform an operation comprising identifying at least one rule for a home screen of a mobile device, wherein the at least one rule is determined based on a current location of a mobile device, identifying a modification for a first object displayed on the home screen of the mobile device, wherein the modification is associated with the at least one rule and the current location of the mobile device, applying the modification to the first object, and outputting the home screen on the mobile device, wherein the outputted home screen includes the modified first object.

18 Claims, 5 Drawing Sheets

(56) References Cited

U.S. PATENT DOCUMENTS

| | | | |
|---|---|---|---|
| 2012/0158472 A1 | 6/2012 | Singh et al. | |
| 2012/0204131 A1 | 8/2012 | Hoang et al. | |
| 2012/0317498 A1 | 12/2012 | Logan et al. | |
| 2014/0201655 A1 | 7/2014 | Mahaffey et al. | |
| 2014/0222564 A1* | 8/2014 | Kranendonk | G06Q 50/01 705/14.53 |
| 2014/0325435 A1 | 10/2014 | Jung et al. | |
| 2015/0026608 A1 | 1/2015 | Wu et al. | |
| 2015/0026615 A1 | 1/2015 | Choi et al. | |
| 2015/0242798 A1* | 8/2015 | Zou | G06Q 10/06311 705/7.15 |
| 2017/0068448 A1* | 3/2017 | Ghassabian | G06F 3/04886 |

OTHER PUBLICATIONS

Bing search q=crowdsource+desktop&src=IE-Search (Year: 2020).*
Burkell et al., "Privacy Mechanisms and Instant Messaging". Faculty of Information and media Studies, The University of Western Ontario, London ON 23 pages.
Shin et al., "Understanding and prediction of mobile application usage for smart phones."UbiComp'12, Sep. 5-8, 2012, Pittsburgh. ACM, 2012. 10 pages.
Kjeldskov et al., "Just-for-Us: A Context-Aware Mobile Information System Facilitating Sociality." In Proceedings of Mobile HCI 2005. Sep. 19-22, 2005. 30 pages. Springer. Salzburg, Austria.
Sultanum et al. "Watchboard: Curated Microblogging for the Enterprise." CHI'14 Abstracts on Human Factors in Computing Systems. ACM, Apr. 26-May 1, 2014. 6 pages. Toronto, Ontario, Canada.
Google, "Secret Home: Android Apps on Google Play". Rsetrieved from <https://play.google.com/store/apps/details?id=com.blocco.plugin.apps.action.HomeLauncher> on Jun. 10, 2016. 4 pages.
Engadget, "How to completely hide any app or folder on your iPhone or iPad". Retrieved from <https://www.engadget.com/2014/03/26/how-to-completely-hide-any-app-or-folder-on-your-iphone-or-ipad/> on Jun. 10, 2016.
Bogawat, "Complete Guide to Customizing Your Screen Icons". Appstorm Android. Retrieved from <http://android.appstorm.net/how-to/customization/complete-guide-to-customizing-your-home-screen-icons/> on Jun. 10, 2016. 10 pages.
New Relic, Automatic Application Naming:. Retrieved from <https://docs.newrelic.com/docs/agents/java-agent/ configuration/automatic-application-naming> on Jun. 10, 2016. 5 pages.
Stackerflow, "How to change the name of application in Launcher in android according to the language selected in Settings of Phone?". Retrieved from <http://stackoverflow.com/questions/5551939/how-to-change-the-name-of-application-in-launcher-in-android-according-to-the-la> on Jun. 10, 2016. 2 pages.

* cited by examiner

LOCATION-BASED HOME SCREEN CUSTOMIZATION

BACKGROUND

The present invention relates to computing devices, and more specifically, to providing location-based home screen customization for computing devices.

Computing devices, such as mobile devices, may provide a home screen which displays a wallpaper, installed applications, shortcuts, widgets, and other types of objects. Often, these objects are associated with an icon and an application name. Users often may customize their home screen, such as by selecting a new wallpaper, hiding application icons (and associated application names), modifying or deleting application names, and changing the icons associated with applications.

SUMMARY

In one embodiment, a method comprises identifying at least one rule for a home screen of a mobile device, wherein the at least one rule is determined based on a current location of a mobile device, identifying a modification for a first object displayed on the home screen of the mobile device, wherein the modification is associated with the at least one rule and the current location of the mobile device, applying the modification to the first object, and outputting the home screen on the mobile device, wherein the outputted home screen includes the modified first object.

In another embodiment, a system comprises a processor and a memory containing a program, which when executed by the processor, performs an operation comprising identifying at least one rule for a home screen of a mobile device, wherein the at least one rule is determined based on a current location of a mobile device, identifying a modification for a first object displayed on the home screen of the mobile device, wherein the modification is associated with the at least one rule and the current location of the mobile device, applying the modification to the first object, and outputting the home screen on the mobile device, wherein the outputted home screen includes the modified first object.

In still another embodiment, a computer program product comprises a computer-readable storage medium having computer-readable program code embodied therewith, the computer-readable program code executable by a processor to perform an operation comprising identifying at least one rule for a home screen of a mobile device, wherein the at least one rule is determined based on a current location of a mobile device, identifying a modification for a first object displayed on the home screen of the mobile device, wherein the modification is associated with the at least one rule and the current location of the mobile device, applying the modification to the first object, and outputting the home screen on the mobile device, wherein the outputted home screen includes the modified first object.

DETAILED DESCRIPTION

Embodiments disclosed herein dynamically change home screen content presented on a device based at least in part on a set of rules and the location of the device. The home screen content may include, without limitation, wallpapers, application icons, and application names. For example, a user may customize an application's icon and name on the home screen and select a customized wallpaper, and associate the customizations with his home location. However, when the user travels to a second location, the device may automatically reconfigure the home screen based on different rules specific to the second location. For example, the device may remove the customized wallpaper, delete the application name, and restore the application's default icon while the device is in the second location. When the user subsequently returns home, the mobile device may restore the user's customizations.

Figure 1A:
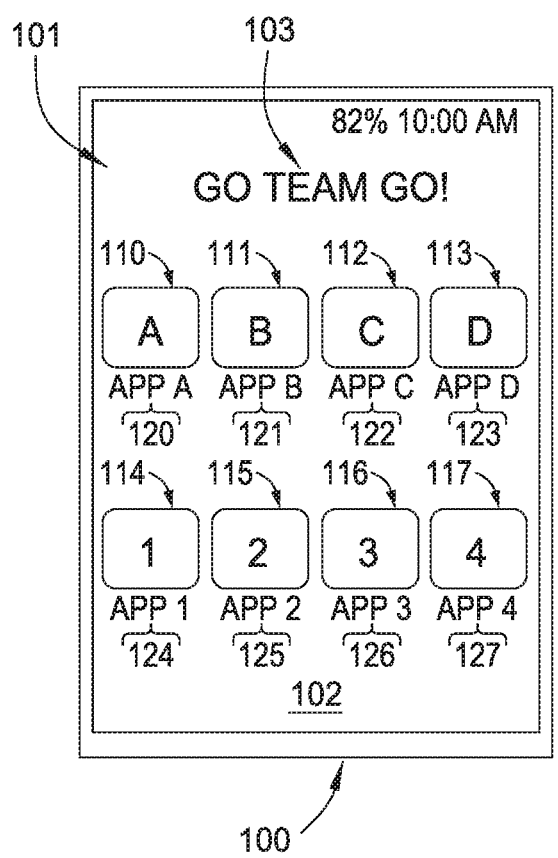
FIGS. 1A-1B depict examples of location-based home screen customization, according to various embodiments.

FIG. 1A depicts a mobile device 100 which provides location-based home screen customization, according one embodiment. The mobile device 100 may be any type of mobile computing device, such as a smartphone, laptop computer, tablet computer, portable gaming device, and the like. As shown, the mobile device 100 includes a display 101 which illustratively outputs a home screen 102. The display 101 may be any type of display device, such as a touchscreen display. The home screen 102 is the main screen on a mobile operating system (not pictured), which may include multiple pages of icons, links, widgets, or other content that may be selected by a user of the device. As shown, the home screen 102 includes a home screen wallpaper 103, a plurality of icons 110-117, and a plurality of icon names 120-127. The wallpaper 103 is generally any type of image, text, or effect that serves as a decorative background for the home screen 103. As shown, a user has customized their wallpaper 103 to include the text (or graphic image including text) "Go Team Go."

The icons 110-117 are representative of any user-selectable object, such as application icons, widgets, links, folders, shortcuts, file icons, and the like. Generally, when the user selects an icon 110-117, the operating system of the mobile device 100 performs an associated action, such as opening an application, file, or widget. As shown, each icon 110-117 may include a visible graphical portion (e.g., the A of icon 110, or the 1 of icon 114). The icon names 120-127 are associated with the icons 110-117, respectively, and may provide a description of the object associated with each icon (e.g., an application name, a folder name, and the like). Therefore, as shown, icon 110 has an associated icon name 120 of "AppA", reflecting an example application name of "Application A." Similarly, application icon 116 has an associated icon name 126 of "App3", reflecting an example application name of "Application 3".

The home screen 102 depicted in FIG. 1A may be associated with one location (e.g., a device's current location, or an estimate thereof). As used herein, a location may refer to any geographic location, such as a city, state, nation, address, workplace, office, home, or other geographic area.

However, when the user (and the device) travels to another location, the mobile device may dynamically modify the home screen 102 based on a set of rules applicable to the new location.

Figure 1B:
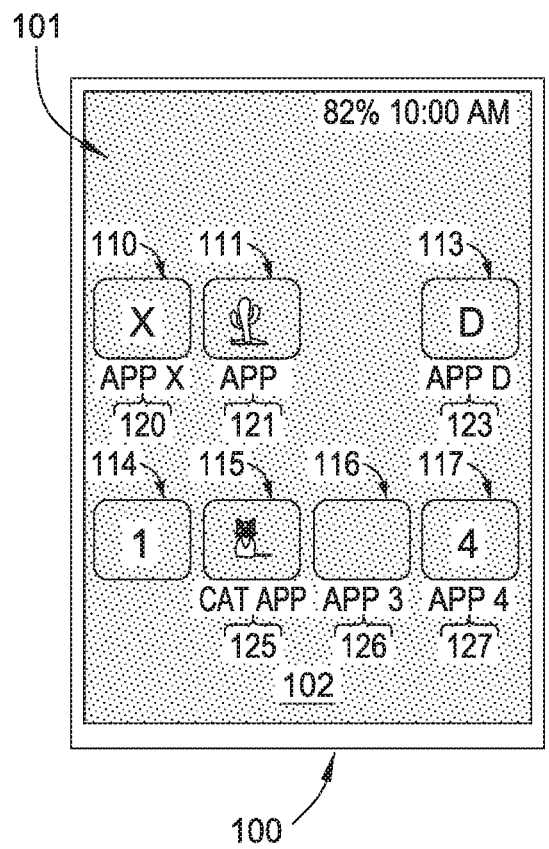

FIG. 1B depicts the home screen 102 which has been dynamically modified based on the device's (and/or the user's) current location. Generally, the mobile device 100 may determine its current location, identify a set of rules applicable to the current location, and modify the home screen 102 accordingly. The mobile device 100 may use any technique to determine location information, such as a Global Positioning System (GPS) module, wireless indoor localization, a location associated with an internet protocol (IP) address of the mobile device 100, and the like. The rules may be selected from one or more of user-defined rules, default rules, and crowd-sourced rules. The rules may be related to any aspect of the home screen 102, such as one or more of the wallpaper 103, the icons 110-117, and the icon names 120-127. Example rules include corporate rules for employees, governmental rules, laws, and ordinances, and the like. Generally, the rules may be applied to perform any type of modification, removal, or addition to the home screen 102, the wallpaper 103, icons 110-117, and icon names 127.

As shown in FIG. 1B, the home screen 102 has been modified in several ways. As shown, the icon 112 and its associated icon name 122 have been removed. The icon 112 and icon name 122 may be removed based on a corporate rule restricting employees from executing the associated application in the workplace. Furthermore, the "A" of icon 110 and "A" of icon name 120 in FIG. 1A have been replaced with an "X" in FIG. 1B. For example, these objects may have been modified based on the application of a rule that specifies the letter A is not permitted for display in the current location.

Further still, the icon 111 and associated icon name 121 have been modified. As shown, the icon 111 is now an image of a cactus, while the "B" has been removed from the icon name 121. Similarly, icon 115 has been changed from a "3" to an image of a cat, and the associated name 125 has been changed from ""App2" to "Cat App." As another example, the icon 116 has been modified from a graphical "3" to a blank icon, while the icon name 126 has been changed from "App3" to "App Three." As shown, the wallpaper 103 has also been modified in FIG. 1B to remove "Go Team Go" in favor of a dotted background.

Figure 2:
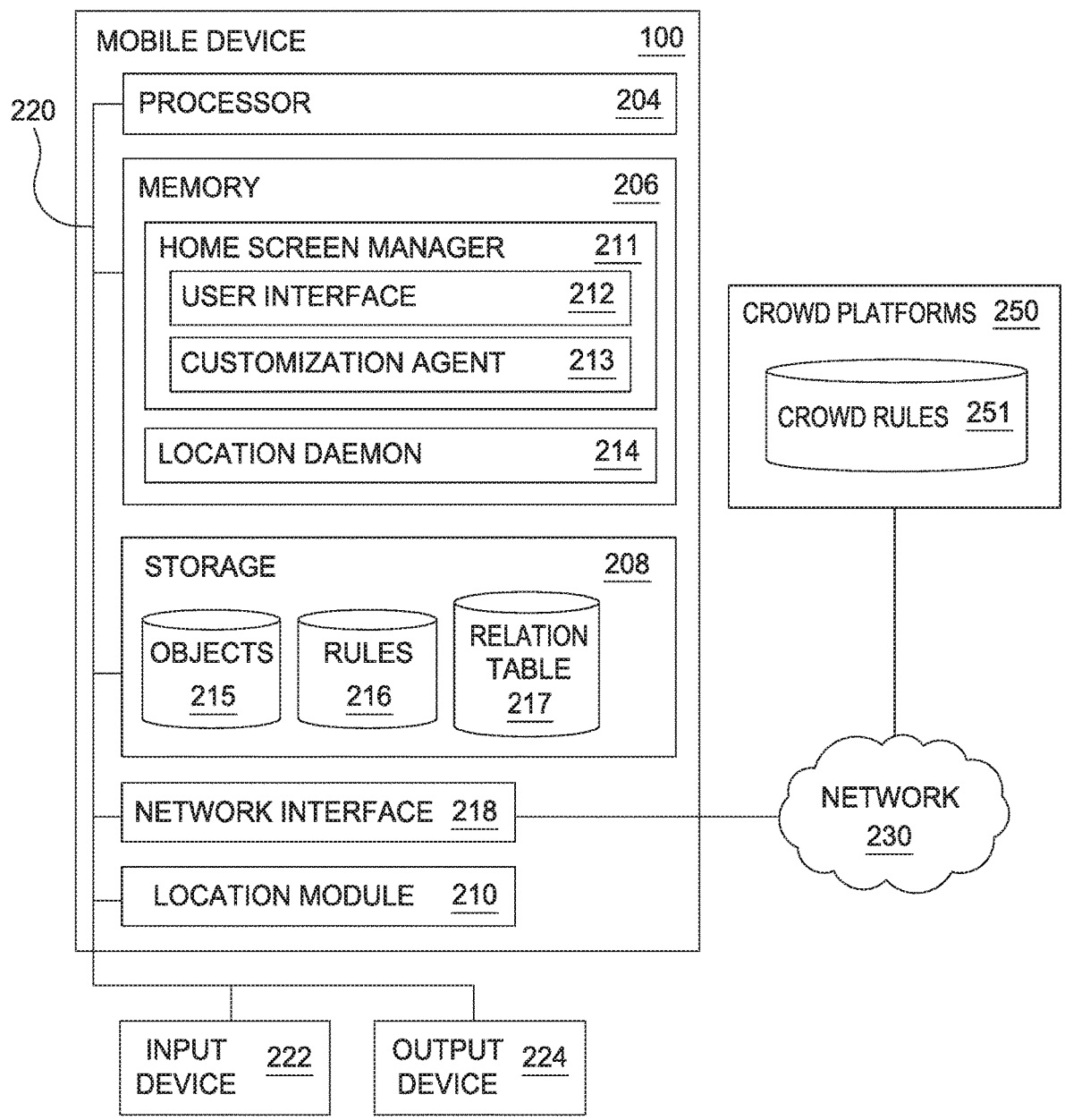
FIG. 2 is a block diagram illustrating a system configured to provide location-based home screen customization, according to one embodiment.

FIG. 2 is a block diagram illustrating a system 200 configured to provide location-based home screen customization, according to one embodiment. The networked system 200 includes the mobile device 100. The mobile device 100 may also be connected to other computers via a network 230. In general, the network 230 may be a telecommunications network and/or a wide area network (WAN). In a particular embodiment, the network 230 is the Internet.

The mobile device 100 generally includes a processor 204 which obtains instructions and data via a bus 220 from a memory 206 and/or a storage 208. The mobile device 100 may also include one or more network interface devices 218, location modules 210, input devices 222, and output devices 224 connected to the bus 220. The mobile device 100 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is a programmable logic device that performs instruction, logic, and mathematical processing, and may be representative of one or more CPUs. The network interface device 218 may be any type of network communications device allowing the mobile device 100 to communicate with other computers via the network 230. The location module 210 is any hardware, software, or combination thereof which estimates the location of the mobile device 100. Examples of the location module 210 include a GPS module.

The storage 208 is representative of hard-disk drives, solid state drives, flash memory devices, optical media and the like. Generally, the storage 208 stores application programs and data for use by the mobile device 100. In addition, the memory 206 and the storage 208 may be considered to include memory physically located elsewhere; for example, on another computer coupled to the mobile device 100 via the bus 220.

The input device 222 may be any device for providing input to the mobile device 100. For example, a keyboard and/or a mouse may be used. The input device 222 represents a wide variety of input devices, including keyboards, mice, controllers, and so on. Furthermore, the input device 222 may include a set of buttons, switches or other physical device mechanisms for controlling the mobile device 100. The output device 224 may include output devices such as monitors, touch screen displays, and so on.

As shown, the memory 206 contains a home screen manager 211 and a location daemon 214. The home screen manager 211 is configured to generate, output, and manage the home screen 102 of the mobile device 100, which includes dynamically modifying the home screen 102 based on one or more rules 216 that are associated with the current location of the mobile device 100. The location daemon 214 is a monitoring program which periodically receives data from the location module 210 to determine a location estimate of the mobile device 100.

Figure 5:
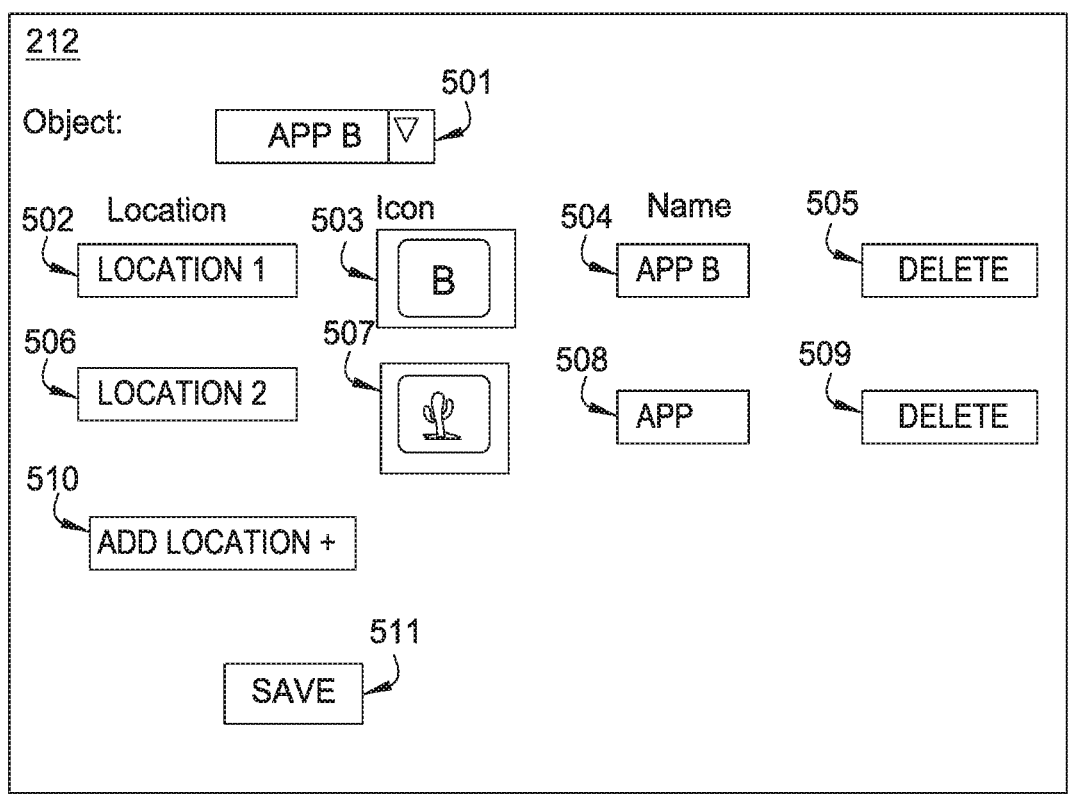
FIG. 5 illustrates an example user interface to define customization rules, according to one embodiment.

As shown, the home screen manager 211 includes a user interface 212 and a customization agent 213. The user interface 212 provides a mechanism for users to create, modify, and/or delete the rules 216 and/or relationships between object icons, object (or icon) names, and location. An example user interface 212 is depicted in FIG. 5. The customization agent 213 is configured to modify, remove, or add object icons and/or icon names of the home screen 102 based on the location of the mobile device 100, the rules 216, relation table 217, and other contextual factors. Generally, when the customization agent 213 receives an indication from the location daemon 214 that the location of the mobile device 100 has changed, the customization agent 213 may reference the rules 216 to identify rules applicable to the current location and the relation table 217 to identify modifications that need to be made to the home screen 102. The customization agent 213 may then modify the home screen 103 accordingly, such as by renaming object names, changing object icons, removing icons and/or names, and the like.

In addition, the customization agent 213 may provide other context-based changes. In at least one embodiment, the customization agent 213 may further modify the home screen 102 based on a current time of day. For example, the customization agent 213 may modify the wallpaper 103 based on user-defined (or system default) timing rules, which may reflect when the user is at work or outside of work. Therefore, the customization agent 213 may modify the home screen 102 to depict a workplace-appropriate wallpaper 103 during business hours (even if the device is not located in an office or other similar environment), while having a user-preferred wallpaper 103 outside of business hours and/or weekends. However, in one embodiment, if the device is in the workplace, the customization agent 213 may apply workplace-specific rules even if it is outside of business hours or on the weekend.

In another embodiment, the customization agent 213 may apply event or application based contextual changes to the home screen 102. Generally, the customization agent 213 may monitor applications and/or events executing on the mobile device 100, and modify the home screen 102 based on detected applications and/or events. For example, if an application which shares the contents of the display 101 to remote users is executing on the device 100, the customization agent 213 may modify the home screen 102 to remove user customizations (such as custom fonts, icons, wallpapers, etc.). As another example, if a user is capturing a screenshot, the customization agent 213 may remove the wallpaper 103 before capturing the screenshot, and restore the wallpaper 103 after capturing the screenshot. As still another example, when the device 100 is connected to a secure corporate network, the customization agent 213 may modify the home screen 102 even if the device is not located in a corporate-owned building.

As shown, the storage 208 contains an object store 215, rules 216, and a relation table 217. The objects 215 include any type of objects and associated metadata. For example, the objects 215 may store applications, links, fonts, widgets, and the like. Each object 215 may be associated with one or more icons and/or one or more object names. For example, a web browser may have a stock (or default) icon and name provided by the developer of the web browser. However, a user may associate the web browser with a plurality of different icons and names, which may be stored as metadata associated with the web browser in the objects 215. The rules 216 specify conditions that must be fulfilled by object icons, object names, wallpapers, and/or home screens based on location or other contextual factors. For example, a first rule may state that pictures of dogs are not permitted in location X, while a second rule may state that the text "text" is not permitted in location Y, and a third rule may prohibit users from opening application A in location Z. In addition, the rules 216 may also be context-based, such as a user-defined rule which automatically applies location-specific themes to the home screen 102. For example, a first theme rule in the rules 216 may specify to change the wallpaper to a photo of the Parthenon when the device 100 is located in Greece, apply Greek-styled fonts to the home screen 102, and the like. As another example, a second theme rule in the rules 216 may specify to change the wallpaper 103 to a photo of the Colosseum when the device 100 is located in Italy. Generally, the rules (regardless of type) may modify any aspect of the home screen 102, such as fonts, icons, text size, and the like. Furthermore, the rules 216 may be related to time of day, day of the week, events and/or applications executing on the mobile device 100, and the like. The relation table 217 stores associations between locations, objects, object names, and object icons. Doing so allows the customization agent 213 to identify object icons, object names, wallpapers, and the like, which are associated with the current location of the mobile device, and modify the home screen 102 accordingly.

As shown, the system 200 includes one or more crowd platforms 250. The crowd platforms 250 are representative of crowd sourcing platforms, such as IBM's InnovationJam, where users may define one or more crowd rules 251. Users of the crowd platforms 250 may be more familiar with local rules, laws, and the like. Therefore, these users may be in a better position to determine acceptability than users who are not as familiar with the area (e.g., users who have not visited these areas). The crowd rules 251 therefore may include user-defined location-specific rules for object names, object icons, wallpapers, and home screens. Generally, users in the crowd platforms 250 may review one or more rules in the rules 216, crowd rules 251, location specific objects in the objects 215, and associations in the relation table 217. For example, if a user has never traveled to location Z, the user may be unaware as to whether his custom web browser icon is acceptable in location Z. However, the user may submit the icon to the crowd platforms 250, where users in location Z (or who are otherwise familiar with location Z) can provide feedback as to whether the icon is acceptable in location Z. The home screen manager 211 may receive the feedback and update the objects 215, rules 216, and relation table 217 accordingly. For example, if crowd feedback marks an object 215 as not appropriate for a given location, the objects 215, rules 216, and relation table 217 may be updated to reflect that the object is not appropriate for the specified location. Similarly, the home screen manager 211 may retrieve and store the crowd rules 251 in the storage 208.

Figure 3:
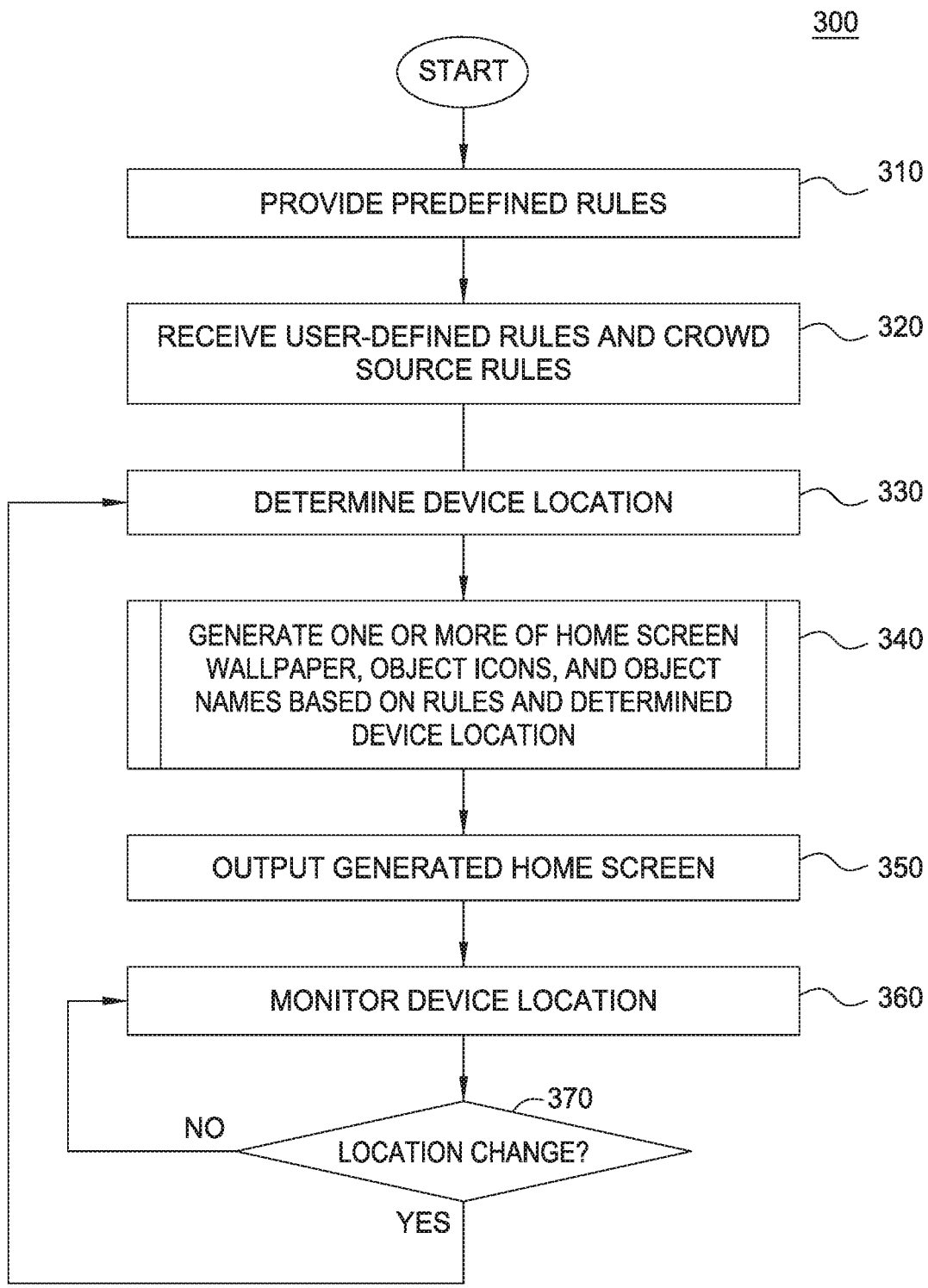
FIG. 3 is a flow chart illustrating a method to provide location-based home screen customization, according to one embodiment.
Figure 4:
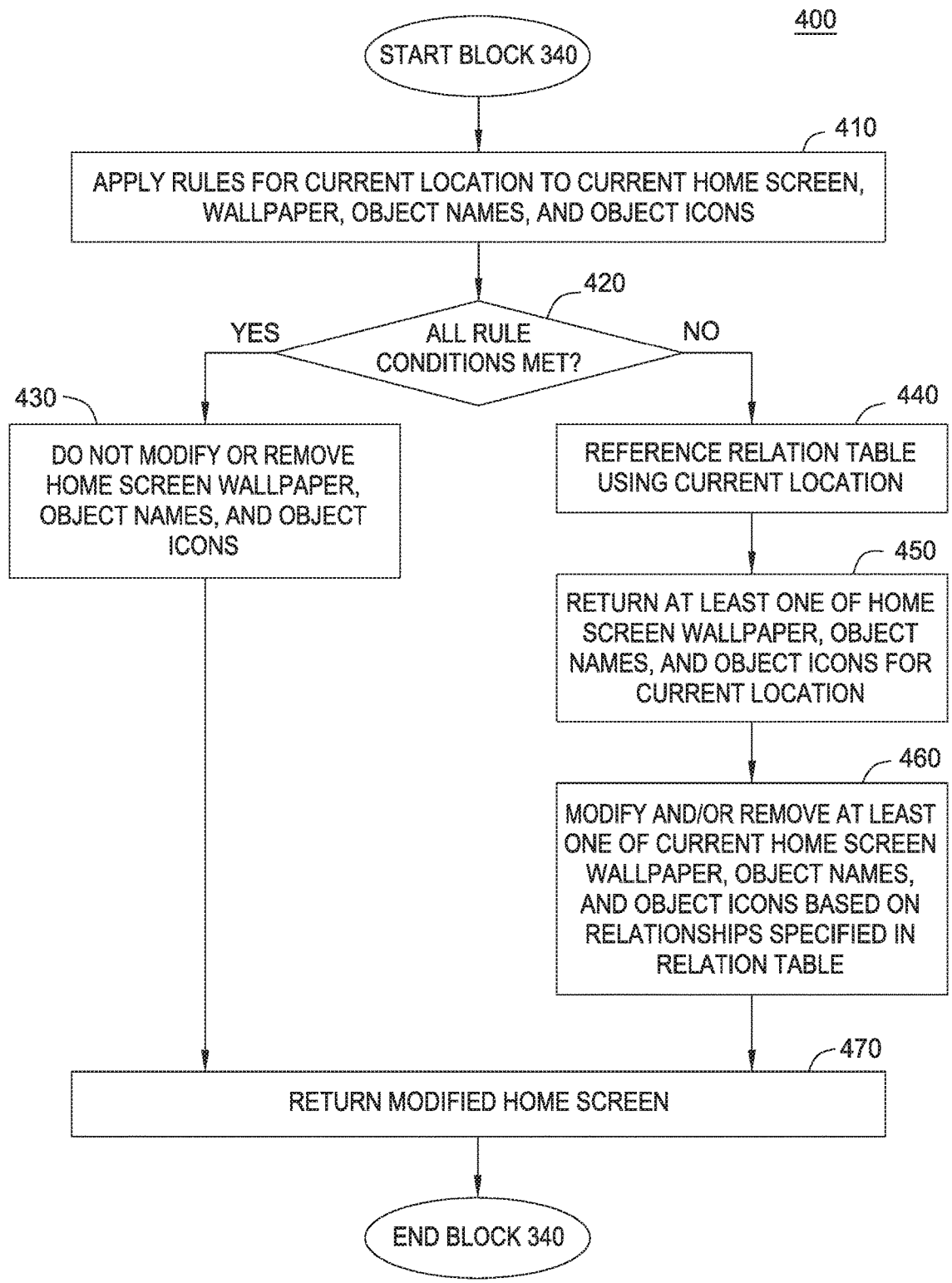
FIG. 4 is a flow chart illustrating a method to generate a home screen, object icons, and object names based on rules and a device location, according to one embodiment.

FIG. 3 is a flow chart illustrating a method 300 to provide location-based home screen customization, according to one embodiment. As shown, the method 300 begins at block 310, where one or more predefined system default rules are provided in the rules 216. For example, a corporation may have guidelines that require mobile devices to be secured to protect confidential data. Therefore, the corporation may define rules in the rules 216 that specify which applications should be locked or available at different locations. At block 320, the home screen manager 211 may receive user-defined rules from the rules 216 and/or crowd sourced rules from the crowd rules 251. At block 330, the location daemon 214 may determine a location estimate of the mobile device 100 based on location data received from the location module 210. At block 340, described in greater detail with reference to FIG. 4, the home screen manager 211 may generate a home screen which includes one or more of a wallpaper, object icons, object names based on the rules 216, the device's current location, and the relation table 217. For example, the home screen manager 211 may reference the relation table 217 using the device's current location, which may return a set of objects, object icons, and object names associated with the current location. The home screen manager 211 may then identify the returned objects in the objects 215, and generate a home screen accordingly. At block 250, the home screen manager 211 may output the home screen generated at block 340. At block 360, the location daemon 214 monitors the device location at periodic timing intervals. At block 370, the location daemon 214 determines whether the device's location has changed. In at least one embodiment, the location daemon 214 may apply a threshold in determining whether the device's location changed. The threshold may be based on a distance (e.g. 100 meters, 100 kilometers, etc.) and/or legal boundaries (e.g., leaving the borders of a city, state, or nation). If the location daemon 214 determines that the device's location has changed, the method returns to block 370, where the home screen manager 211 may modify the home screen based on the updated location. If the location has not changed, the method returns to block 360, where the location FIG. 4 is a flow chart illustrating a method 400 corresponding to block 340 to generate a home screen, object icons, and object names based on rules and a device location, according to one embodiment. As shown, the method 400 begins at block 410, where the customization agent 213 applies the rules associated with the current device location to the current home screen. Specifically, the customization agent 213 may apply the relevant rules to each object icon, object name, wallpaper, and other items displayed on the current home screen. At block 420, the customization agent 213 determines whether all rule conditions are met. If all rule conditions are met, the method proceeds to block 430, where the home screen is not modified. Specifically, the customization agent 213 will not modify or remove the home screen wallpaper, object icons, or object names. The method then proceeds to block 470.

Returning to block 420, if one or more of the home screen wallpaper, object names, and object icons do not satisfy all the rule conditions, the method proceeds to block 440. At block 440, the customization agent 213 may reference the relation table 217 using the device's current location estimate. Doing so returns at least one modification at block 450, such as removing an object icon, modifying an object name, replacing a widget, and the like. At block 460, the customization agent 213 may modify, add, and/or remove one or more objects on the current home screen based on relationships returned from the relation table 217. For example, the customization agent 213 may modify, add, and/or remove the wallpaper, one or more object icons, and/or one or more object names. At block 470, the customization agent 213 may return the modified home screen.

FIG. 5 illustrates an example graphical user interface (GUI) 212 to define customization rules, according to one embodiment. Generally, the GUI 212 allows users to create, modify, and/or delete rules from the rules 216 and/or the crowd rules 251. As shown, the GUI 212 includes a drop-down box 501 that allows a user to select an object that is part of the home screen 102. The drop-down box 501 may include object icons, object names, and the like. As shown, a user has selected an example object "AppB", corresponding to an object depicted on the home screen 102 of FIGS. 1A-1B. The GUI 212 further includes fields where a user may enter a location, associated object icon, and object name. For example, as shown, in location box 502, a user has entered an example location "Location 1" which may refer to a city, state, nation, address, workplace, office, home, or other predefined area. Furthermore, the user has provided the object icon "B" in box 503, and defined the name "AppB" in box 504. Similarly, the user has added a second location, "Location 2", in box 506. The user has selected the cactus icon in box 507 and the name "App" in box 508. As shown, the user has the option to add additional locations and associated icons and names by selecting button 510. The user may also delete entries using buttons 505 and 509. However, deletion button 509 is grayed out, indicating this entry is not user-configurable, and therefore cannot be deleted or otherwise modified. Finally, the user may save their work using the save button 511, which stores an association in the relation table 217, icons/names in the objects 215, and rules in the rules 216.

Advantageously, embodiments disclosed herein automatically change the home screens of mobile devices based on rules and the current location of the mobile device. For example, object icons, object names, wallpapers, and the like may all be added, removed, or modified based on the device's current location. Doing so improves the field of mobile device operating systems by providing home screens that are appropriate for any location that a user may possess the device in.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the home screen manager 211 could execute on a computing system in the cloud and receive crowd rules 251 from the crowd platforms 250. In such a case, the home screen manager 211 could define rules 216 and store the rules 216 at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   transmitting, to a crowd-source platform, an object icon and an object name; submitting, to the crowd-source platform, an indication of a future location to which a mobile device will travel;
   requesting, from the crowd-source platform, information about whether the object icon and object name are appropriate at the future location;
   responsive to requesting the information, receiving, from the crowd-source platform, feedback from a plurality of users, wherein each of the plurality of users is currently located at the indicated future location, and wherein the feedback indicates that the object icon and object name are against one or more local laws at the indicated future location;
   generating a crowd-sourced rule based on the feedback, wherein the crowd-sourced rule comprises an instruction to modify the object icon and object name when the mobile device is at the indicated future location;
   monitoring an application context of the mobile device, wherein the application context includes whether a home screen of the mobile device is being shared with at least one other device, and whether a screenshot of the home screen is being captured;
   identifying a first rule for the home screen of the mobile device, wherein the first rule is determined based on a current location of the mobile device and the application context of the mobile device;
   upon determining that the first rule is satisfied, based on the current location and the context of the mobile device, identifying a first modification for a first object displayed on the home screen of the mobile device, wherein the first modification is defined by the first rule;
   applying the first modification to the first object, wherein the first modification comprises at least one of: (i) modifying a name displayed with the first object, and (ii) replacing a first icon representing the first object with a second icon to represent the first object; and
   outputting the home screen on the mobile device, wherein the outputted home screen includes the modified first object.

2. The method of claim 1, wherein the first object is of a plurality of objects displayed on the home screen, wherein each of the plurality of objects comprise one of: (i) an object icon, (ii) an object name associated with a respective object icon, and (iii) a home screen wallpaper.

3. The method of claim 1, wherein the first rule is of a plurality of rules, wherein the plurality of rules comprise: (i) user-defined rules, (ii) system default rules, (iii) crowd-sourced rules, (iv) time-based rules, (v) application-based rules, (vi) location-based rules, and (vii) event-based rules.

4. The method of claim 1, further comprising:
   monitoring the location of the mobile device;
   determining that the location of the mobile device has changed;
   identifying a set of rules associated with the changed location of the mobile device;
   identifying a modification for a second object displayed on the home screen of the mobile device, wherein the modification is associated with the set of rules and the changed location of the mobile device;
   applying the modification to the second object;
   outputting the home screen on the mobile device, wherein the outputted home screen includes the modified second object;
   determining that the modification to the first object is not associated with the changed location of the mobile device;
   removing the modification applied to the first object; and
   outputting the home screen on the mobile device, wherein the outputted home screen includes the modified second object and the unmodified first object.

5. The method of claim 1, the method further comprising:
   identifying a second rule for a home screen of a mobile device;
   upon determining that the second rule is also satisfied, identifying a second modification for the first object displayed on the home screen of the mobile device, wherein the second modification is defined by the second rule; and
   declining to apply the second modification to the first object, based on determining that both the first rule and the second rule are satisfied, and based further on determining that the first rule has a higher priority than the second rule.

6. A system, comprising: a computer processor; and
   a memory containing a program, which when executed by the processor, performs an operation comprising:
   transmitting, to a crowd-source platform, an object icon and an object name;
   submitting, to the crowd-source platform, an indication of a future location to which a mobile device will travel;
   requesting, from the crowd-source platform, information about whether the object icon and object name are appropriate at the future location:
   responsive to requesting the information, receiving, from the crowd-source platform, feedback from a plurality of users, wherein each of the plurality of users is currently located at the indicated future location, and wherein the feedback indicates that the object icon and object name are against one or more local laws at the indicated future location;
   generating a crowd-sourced rule based on the feedback, wherein the crowd-sourced rule comprises an instruction to modify the object icon and object name when the mobile device is at the indicated future location;
   monitoring an application context of the mobile device, wherein the application context includes whether a home screen of the mobile device is being shared with at least one other device, and whether a screenshot of the home screen is being captured;
   identifying a first rule for the home screen of the mobile device, wherein the first rule is determined based on a current location of the mobile device and the application context of the mobile device;
   upon determining that the first rule is satisfied, based on the current location and the context of the mobile device, identifying a first modification for a first object displayed on the home screen of the mobile device, wherein the first modification is defined by the first rule;
   applying the first modification to the first object, wherein the first modification comprises at least one of: (i) modifying a name displayed with the first object, and (ii) replacing a first icon representing the first object with a second icon to represent the first object; and outputting the home screen on the mobile device, wherein the outputted home screen includes the modified first object.

7. The system of claim 6, wherein the first object is of a plurality of objects displayed on the home screen, wherein each of the plurality of objects comprise one of: (i) an object icon, (ii) an object name associated with a respective object icon, and (iii) a home screen wallpaper.

8. The system of claim 6, wherein the modification comprises one or more of: (i) removing the object icon of the first object, (ii) removing the object name associated with the object icon of the first object, (iii) removing the home screen wallpaper, (iv) replacing the object icon of the first object with a different object icon, (v) replacing the object name associated with the object icon of the first object, and (vi) replacing the home screen wallpaper.

9. The system of claim 6, wherein the first rule is of a plurality of rules, wherein the plurality of rules comprise: (i) user-defined rules, (ii) system default rules, (iii) crowd-sourced rules, (iv) time-based rules, (v) application-based rules, (vi) location-based rules, and (vii) event-based rules.

10. The system of claim 6, the operation further comprising:
receiving, via a user interface, a user-defined object icon, a user-defined object name for the user-defined object icon, and a user-defined location;
storing an association between the user-defined object icon, the user-defined object name, and the user-defined location;
determining that the mobile device is located in the user-defined location; and
modifying the home screen to include the user-defined object icon and the user-defined object name.

11. The system of claim 6, the operation further comprising:
monitoring the location of the mobile device;
determining that the location of the mobile device has changed;
identifying a set of rules associated with the changed location of the mobile device;
identifying a modification for a second object displayed on the home screen of the mobile device, wherein the modification is associated with the set of rules and the changed location of the mobile device;
applying the modification to the second object;
outputting the home screen on the mobile device, wherein the outputted home screen includes the modified second object;
determining that the modification to the first object is not associated with the changed location of the mobile device;
removing the modification applied to the first object; and
outputting the home screen on the mobile device, wherein the outputted home screen includes the modified second object and the unmodified first object.

12. The system of claim 6 the operation further comprising:
identifying a second rule for a home screen of a mobile device;
upon determining that the second rule is also satisfied, identifying a second modification for the first object displayed on the home screen of the mobile device, wherein the second modification is defined by the second rule; and
declining to apply the second modification to the first object, based on determining that both the first rule and the second rule are satisfied, and based further on determining that the first rule has a higher priority than the second rule.

13. A computer program product, comprising:
a non-transitory computer-readable storage medium having computer-readable program code embodied therewith, the computer-readable program code executable by one or more computer processors to perform an operation comprising:
transmitting, to a crowd-source platform, an object icon and an object name;
submitting, to the crowd-source platform, an indication of a future location to which a mobile device will travel;
requesting, from the crowd-source platform, information about whether the object icon and object name are appropriate at the future location;
responsive to requesting the information, receiving, from the crowd-source platform, feedback from a plurality of users, wherein each of the plurality of users is currently located at the indicated future location, and wherein the feedback indicates that the object icon and object name are against one or more local laws at the indicated future location;
generating a crowd-sourced rule based on the feedback, wherein the crowd-sourced rule comprises an instruction to modify the object icon and object name when the mobile device is at the indicated future location;
monitoring an application context of the mobile device, wherein the application context includes whether a home screen of the mobile device is being shared with at least one other device, and whether a screenshot of the home screen is being captured;
identifying a first rule for the home screen of the mobile device, wherein the first rule is determined based on a current location of the mobile device and the application context of the mobile device;
upon determining that the first rule is satisfied, based on the current location and the context of the mobile device, identifying a first modification for a first object displayed on the home screen of the mobile device, wherein the first modification is defined by the first rule;
applying the first modification to the first object, wherein the first modification comprises at least one of: (i) modifying a name displayed with the first object, and (ii) replacing a first icon representing the first object with a second icon to represent the first object; and
outputting the home screen on the mobile device, wherein the outputted home screen includes the modified first object.

14. The computer program product of claim 13, wherein the first object is of a plurality of objects displayed on the home screen, wherein each of the plurality of objects comprise one of: (i) an object icon, (ii) an object name associated with a respective object icon, and (iii) a home screen wallpaper.

15. The computer program product of claim 13, wherein the at least one rule is of a plurality of rules, wherein the plurality of rules comprise: (i) user-defined rules, (ii) system default rules, (iii) crowd-sourced rules, (iv) time-based rules, (v) application-based rules, (vi) location-based rules, and (vii) event-based rules.

16. The computer program product of claim 13, the operation further comprising:
receiving, via a user interface, a user-defined object icon, a user-defined object name for the user-defined object icon, and a user-defined location;

storing an association between the user-defined object icon, the user-defined object name, and the user-defined location;

determining that the mobile device is located in the user-defined location; and modifying the home screen to include the user-defined object icon and the user-defined object name.

17. The computer program product of claim 13, the operation further comprising:

monitoring the location of the mobile device;

determining that the location of the mobile device has changed;

identifying a set of rules associated with the changed location of the mobile device;

identifying a modification for a second object displayed on the home screen of the mobile device, wherein the modification is associated with the set of rules and the changed location of the mobile device;

applying the modification to the second object;

determining that the modification to the first object is not associated with the changed location of the mobile device;

removing the modification applied to the first object; and outputting the home screen on the mobile device, wherein the outputted home screen includes the modified second object and the unmodified first object.

18. The computer program product of claim 13, the operation further comprising:

identifying a second rule for a home screen of a mobile device;

upon determining that the second rule is also satisfied, identifying a second modification for the first object displayed on the home screen of the mobile device, wherein the second modification is defined by the second rule; and declining to apply the second modification to the first object, based on determining that both the first rule and the second rule are satisfied, and based further on determining that the first rule has a higher priority than the second rule.

* * * * *